(No Model.)

A. B. CURTIS.
BICYCLE PEDAL.

No. 555,933. Patented Mar. 10, 1896.

Witnesses.

Inventor.
A. B. Curtis
By
Southgate & Southgate
Attorneys

UNITED STATES PATENT OFFICE.

ALBERT B. CURTIS, OF WORCESTER, MASSACHUSETTS.

BICYCLE-PEDAL.

SPECIFICATION forming part of Letters Patent No. 555,933, dated March 10, 1896.

Application filed September 26, 1895. Serial No. 563,720. (No model.)

*To all whom it may concern:*

Be it known that I, ALBERT B. CURTIS, a citizen of the United States, residing at Worcester, in the county of Worcester and State of Massachusetts, have invented a new and useful Improvement in Bicycle-Pedals, of which the following is a specification.

My invention relates to that class of bicycle-pedals which are provided with rubber foot-pieces or bearing-plates.

The objects of my invention are to improve the construction of rubber foot-pieces and to provide means for detachably securing said foot-pieces in place upon the side bars of a pedal-frame, the parts being so constructed as to present an attractive appearance.

To these ends my invention consists of the parts and combinations of parts, as hereinafter described, and more particularly pointed out in the claims at the end of this specification.

Figure 1:
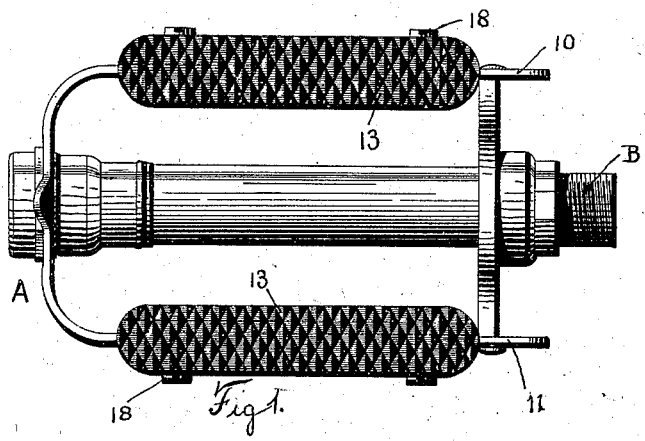
Figure 2:
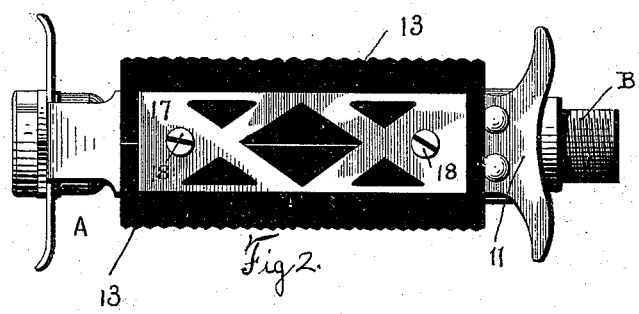
Figures 3, 4:
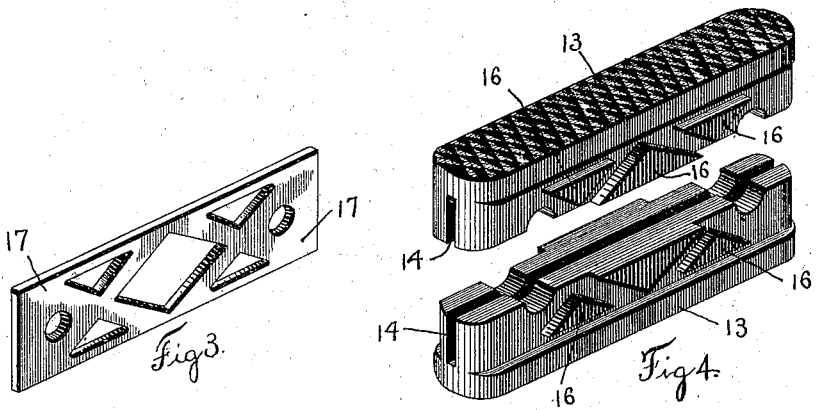
Figure 5:
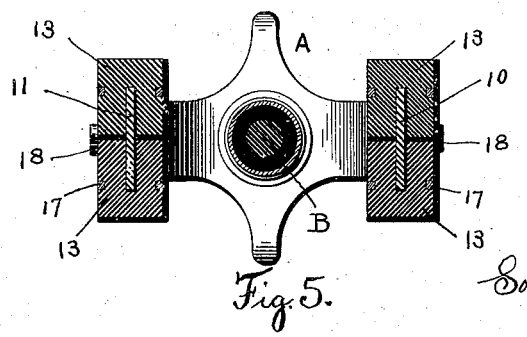

In the accompanying drawings, Figure 1 is a plan view of a bicycle-pedal constructed according to my invention. Fig. 2 is a side view of the same. Fig. 3 is a perspective view of one of the clamping-plates. Fig. 4 is a perspective view of the rubber foot-pieces which are mounted on each side bar of the pedal-frame, and Fig. 5 is a transverse sectional view.

A bicycle-pedal which is constructed according to my invention comprises a pedal-frame, rubber foot-pieces which are mounted upon the pedal-frame, and clamping-plates for securing the rubber foot-pieces in place, the foot-pieces and the clamping-plates being provided with engaging abutments.

Referring to the drawings and in detail, A designates a pedal-frame which may be of any desired construction and which is journaled upon a crank-pin B. Mounted upon the side bars 10 and 11 of the pedal-frame A are four rubber foot-pieces 13, two of the rubber foot-pieces being mounted upon each side bar.

As most clearly illustrated in Fig. 4, the rubber foot-pieces 13 are of a furcated or forked shape, having a longitudinal groove, as 14.

The clamping-plates 17, which fit upon opposite sides of the rubber foot-pieces 13, are made substantially in the form of a grating, and the outer faces of the rubber foot-pieces 13 are recessed or cut away to leave extending abutments 16, which fit into and engage the recesses in the clamping-plates 17. The clamping-plates 17 are fastened together and secured in place by means of the clamping-screws 18.

In a bicycle-pedal as thus constructed it will be seen that the rubber body-pieces may be quickly and firmly secured in place, or may be quickly taken off when it is desired to use the pedal-frame to form a rat-trap pedal. It is also to be noted that a bicycle-pedal as thus constructed forms an ornamental and extremely attractive article.

I am aware that changes may be made in bicycle-pedals constructed according to my invention by those who are skilled in the art and that my improved rubber foot-pieces may be employed upon any desired form of pedal-frame without departing from the scope of my invention as expressed in the claims.

I do not wish, therefore, to be limited to the construction which I have shown and described; but What I do claim, and desire to secure by Letters Patent of the United States, is—

1. The combination of a pedal-frame comprising two side bars substantially parallel with the axis of the pedal, furcated or grooved rubber foot-pieces fitting over said side bars, and clamping-plates for securing the rubber foot-pieces in place, said foot-pieces being provided with extending abutments which engage with and fit into corresponding recesses in the clamping-plates, substantially as described.

2. The combination of a pedal-frame, two independent, furcated or grooved rubber foot-pieces mounted on each side bar of the pedal-frame, and clamping-plates for securing the rubber foot-pieces in place, the clamping-plates being made substantially in the form of a grating, and the rubber foot-pieces being recessed or cut away to form abutments corresponding with the openings in said clamping-plates, substantially as described.

In testimony whereof I have hereunto set my hand in the presence of two subscribing witnesses.

ALBERT B. CURTIS.

Witnesses:
LOUIS W. SOUTHGATE,
PHILIP W. SOUTHGATE.